United States Patent
Weng

(10) Patent No.: US 9,043,998 B2
(45) Date of Patent: Jun. 2, 2015

(54) PORTABLE AQUARIUM FILTER STRUCTURE

(76) Inventor: Min-Che Weng, Makung (TW)

(*) Notice: Subject to any disclaimer, the term of this patent is extended or adjusted under 35 U.S.C. 154(b) by 422 days.

(21) Appl. No.: 13/481,049

(22) Filed: May 25, 2012

(65) Prior Publication Data

US 2013/0313175 A1 Nov. 28, 2013

(51) Int. Cl.
*A01K 63/04* (2006.01)
(52) U.S. Cl.
CPC .................................... *A01K 63/045* (2013.01)
(58) Field of Classification Search
CPC .................................................. A01K 63/045
USPC ............ 210/150, 151, 167.22, 167.26, 221.1, 210/221.2, 905; 119/260, 261
See application file for complete search history.

(56) References Cited

U.S. PATENT DOCUMENTS

| | | | | |
|---|---|---|---|---|
| 5,282,962 A | * | 2/1994 | Chen | 210/167.25 |
| 5,665,227 A | * | 9/1997 | Watt | 210/167.26 |
| 6,732,675 B1 | * | 5/2004 | Liao | 119/259 |
| 7,651,610 B2 | * | 1/2010 | Tsai | 210/167.26 |
| 2006/0163131 A1 | * | 7/2006 | Kieselbach | 210/169 |
| 2007/0227971 A1 | * | 10/2007 | Denney | 210/606 |

FOREIGN PATENT DOCUMENTS

TW  I349524  10/2011

* cited by examiner

*Primary Examiner* — Fred Prince
(74) *Attorney, Agent, or Firm* — Wang Law Firm, Inc.; Li K. Wang; Stephen Hsu

(57) ABSTRACT

An improved portable aquarium filter structure has a box body, wherein its inside has a submersible pump externally connected to an air pipe. Air enters the submersible pump through the air pipe to mix with water flow pumped by the submersible pump so as to produce bubbles. Accordingly, water flow can be treated with bubble removing and purification. A bubble collection box is disposed on the box body to collect filth that is treated with bubble removing, wherein an opening is disposed on the bubble collection box. A converged taper section is disposed at the opening wall of the opening extended toward the box body therein. The filth is decomposed to produce carbon dioxide and acid gas by a protein decomposition unit disposed in the bubble collection box to attract mosquitoes entering the Trap through the tapered opening so as to achieve a goal of catching mosquitoes.

8 Claims, 4 Drawing Sheets

PORTABLE AQUARIUM FILTER STRUCTURE

BACKGROUND OF THE INVENTION

1. Field of the Invention

The present invention relates to an aquarium filter device, and more particularly to a portable aquarium filter device capable of performing multifunctional purification treatment for water quality and capable of catching mosquitoes.

2. Description of the Related Art

An aquarium is taken as purposes of appreciation or decoration to cultivate fishes to increase fun of daily life. The aquarium must be disposed with a filter device to filter protein residue formed by baits and disposal voided by the fishes in water, thereby retaining water quality and preventing the fishes from dying. However, these protein residues that have been filtered are usually abandoned to cause non-environmental protection and a peculiar smell.

In addition, a conventional mosquito catcher attracts mosquitoes through a light source in which a wavelength is 370 nm. Once mosquitoes fall a high voltage electrified wire fence, these mosquitoes are electrified and die. However, some kinds of mosquitoes, such as *Aedes albopictus* and *Aedes aegypti*, do not sensitive to the light source. Consequently, the effect of catching mosquitoes is not obvious. On the other hand, the mosquito catcher electrically shocks mosquitoes through high voltage. Children or pets may be harmed if they carelessly touch the mosquito catcher. Moreover, noise generated by electrically shocking mosquitoes may also influence the quality of daily life.

Therefore, combining the filter device of the aquarium with a function of catching mosquitoes to solve the defect of the conventional mosquito catcher and to save the space, expense and power of additionally disposing the mosquito catcher becomes an important issue.

SUMMARY OF THE INVENTION

In view of the shortcomings of the prior art, the inventor(s) of the present invention based on years of experience in the related industry to conduct extensive researches and experiments, and finally developed an improved portable aquarium filter structure as a principle objective to attract mosquitoes through carbon dioxide and acid gas produced by protein residue fermentation during the filtering process and to catch these mosquitoes through the trap.

A second objective of the invention is to take a small submersible pump as a power to integrate a biochemical filter cotton, a protein remover, a nitrifying bacteria bed and an ultraviolet sterilization into a whole, thereby having effects of greatly improving water quality cleanness of the aquarium and reducing cultivation costs.

To achieve the foregoing objectives, the improved portable aquarium filter structure is provided by the invention and comprises a box body, at least one suspension portion capable of being suspended to an aquarium disposed at an outside of the box body, a submersible pump disposed inside the box body, an air pipe externally connected to the submersible pump, air enter the submersible pump through the air pipe to mix with water flow pumped by the submersible pump so as to produce bubbles such that water flow is treated with bubble removing and purification, wherein a bubble collection box is disposed on the box body to collect filth that has been treated with bubble removing and purification, wherein:
an opening is disposed at the bubble collection box, and an opening wall of the opening has a converged taper section extended toward the box body therein, a protein decomposition unit is contained in the bubble collection box.

DETAILED DESCRIPTION OF THE PREFERRED EMBODIMENTS

The foregoing and other technical characteristics of the present invention will become apparent with the detailed description of the preferred embodiments and the illustration of the related drawings.

With reference to FIG. 1 to FIG. 4, the structure shown in the figures is the embodiment selected by the invention and taken as the depiction and may not be restricted during patent application.

Figure 3:
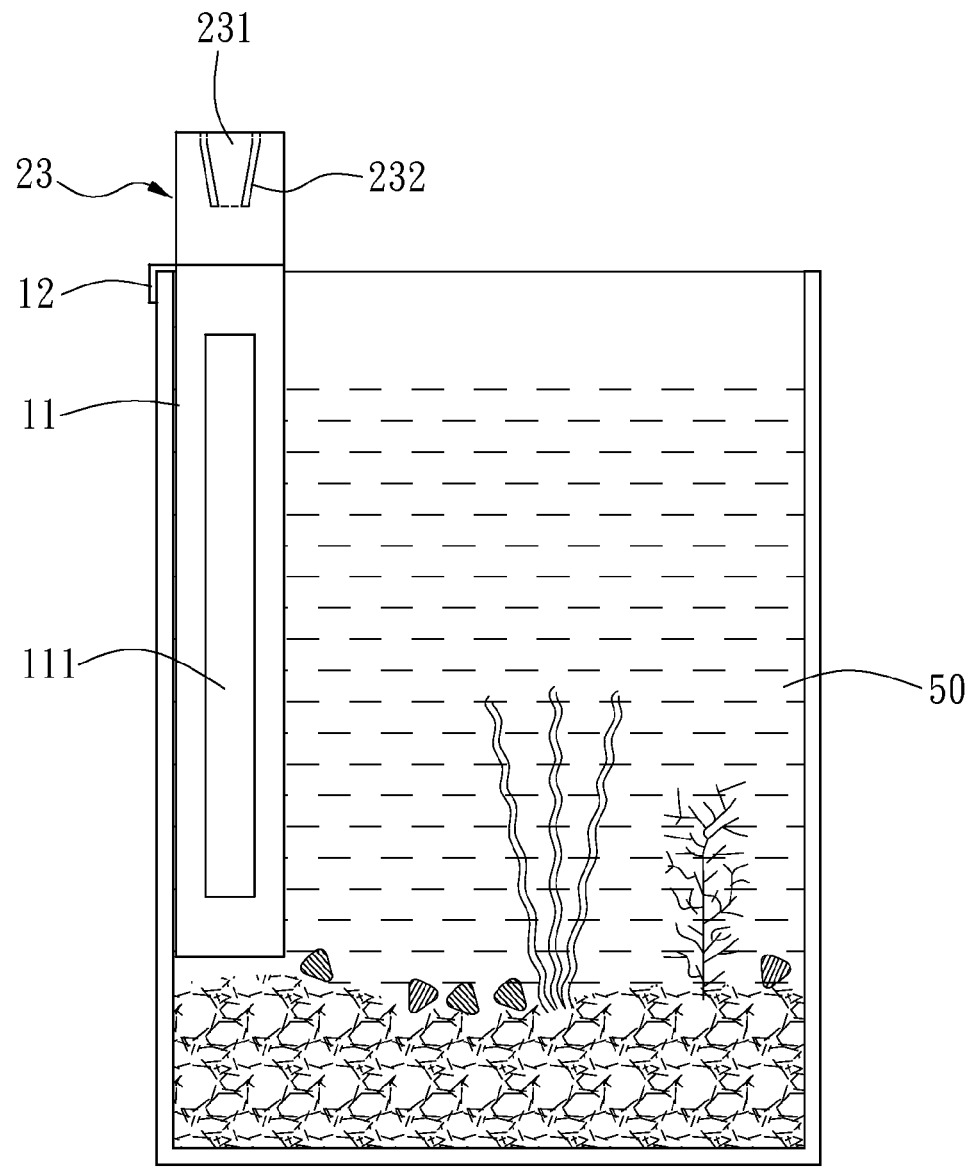
FIG. 3 is a schematic diagram of a using status showing that the structure is installed to an aquarium according to the invention.

An improved portable aquarium filter structure provided by the invention is installed in an aquarium, wherein the invention has a box body 11, and at least one suspension portion 12 is formed at an exterior of the box body 11 and suspended to the aquarium wall of the aquarium as shown in FIG. 3. A first partition 13 is disposed inside the box body 11, and a first containing tank 14 is partitioned by the first partition 13 from the inside of the box body 11. The box body 11 is opened with a water inlet 15 relative to the first containing tank 14. A biochemical filter cotton 16 is disposed on the first containing tank 14. A submersible pump 17 is disposed at the lower portion of the first containing tank 14. The submersible pump 17 pumps water flow from the water inlet 15, and water flow is filtered by the biochemical filter cotton 16. An air pipe 18 is externally connected to the submersible pump 17 such that water flow pumped by the submersible pump 17 is outputted after mixing with air.

A second partition 21 is disposed inside the box body 11 and spaced with the first partition 13 to form a second containing tank 22 between the first partition 13 and the second partition 21. The second containing tank 22 is a hollow space. The high speed water flow pushed by the submersible pump 17 is transported to the second containing tank 22, and proteins that are dissolved in water can be attached to a plurality of bubbles that are produced by water flow transported by the submersible pump 17. These bubbles are continuously accumulated and raised by utilizing low density rising principle so that these bubbles can rise to reach the top of the second containing tank 22. A bubble collection box 23 is disposed on the second containing tank 22 to collect filth after these air bubbles are aerated and can effectively remove proteins existing in water flow through the circulation effect.

A third partition 31 is disposed inside the box body 11 and spaced with the second partition 21 to form a third containing tank 32 between the second partition 21 and the third partition 31. At least one water inflow port 24 communicating with the second containing tank 22 and the third containing tank 32 is opened on the second partition 21, and a plurality of nitrification ceramic rings 33 is contained in the third containing tank 32 to compose a nitrifying bacteria bed. The nitrification ceramic rings 33 in the third containing tank 32 are loaded on a net plate 34 so that a lower space in the third containing tank 32 is partitioned by the net plate 34 to further form a water flow space 35. Accordingly, water flow from the water inflow port 24 firstly flows through the water flow space 35 and then passes through the net plate 34 to enter the nitrifying bacteria bed composed of each nitrification ceramic ring 33. Further, a heat dissipation device 36 is disposed on the third containing tank 32. The heat dissipation device 36 includes at least one heat dissipation fan 37 and a plurality of heat dissipation holes 38 to dissipate heat generated from water flow in the third containing tank 32.

A fourth containing tank 41 communicating with the third containing tank 32 is formed between the third partition 31 and an inner wall surface of the box body 11. An ultraviolet bactericidal lamp 42 is disposed in the fourth containing tank 41, and the box body 11 has a water outlet 43 relative to the fourth containing tank 41 so that water flow inside the box body 11 can be drained away from the box body 11 through the water outlet 43.

Figure 1:
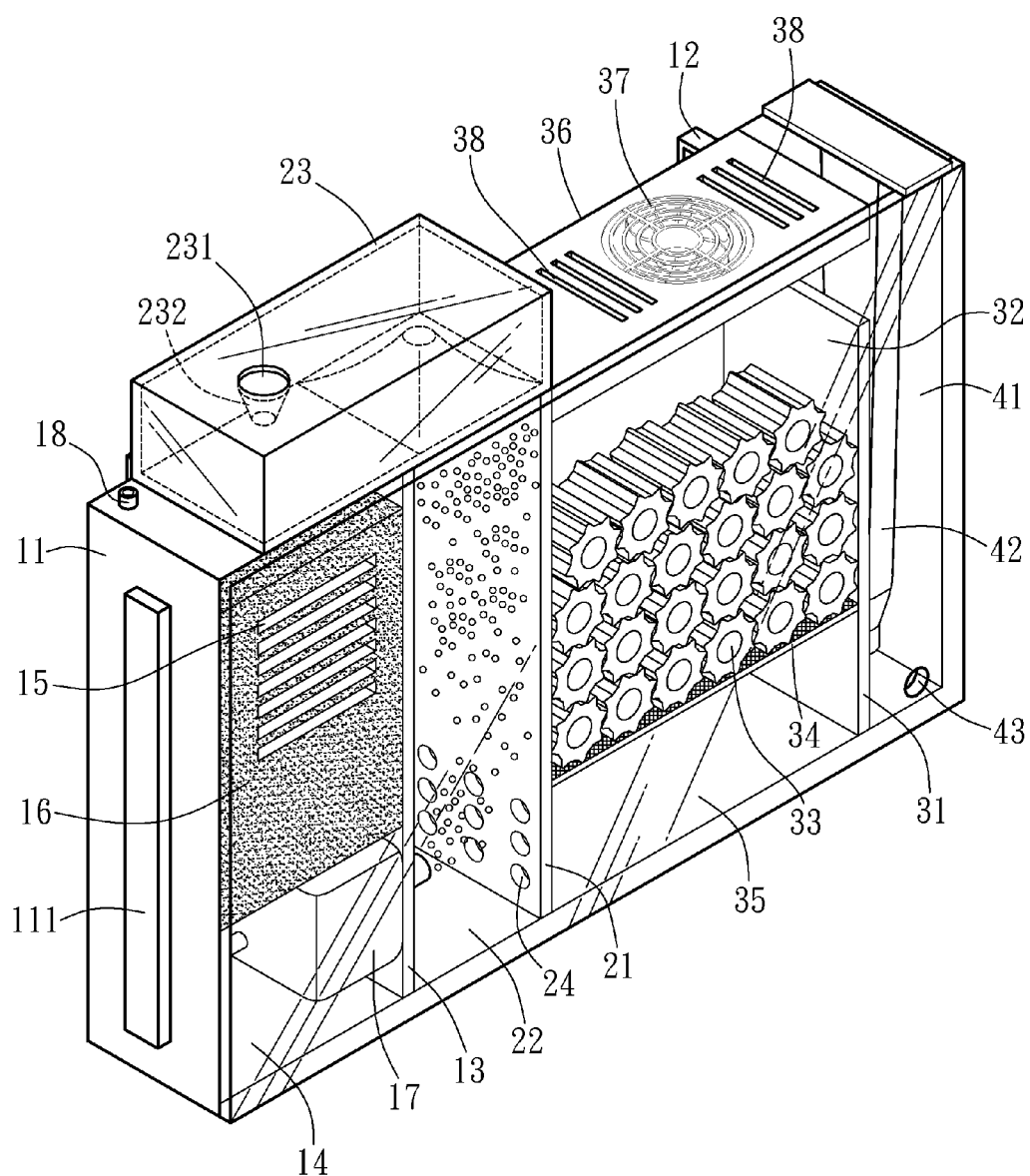
FIG. 1 is a three-dimensional drawing according to the invention.
Figure 2:
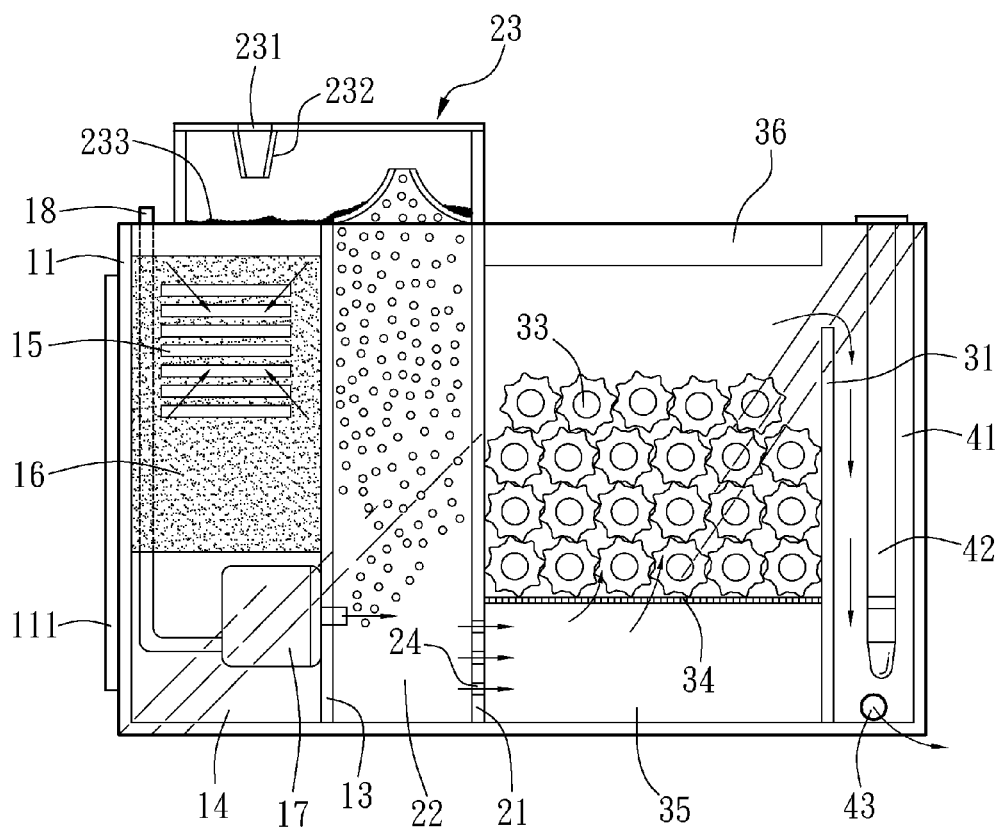
FIG. 2 is a schematic diagram of a using status showing an advance of water flow according to the invention.
Figure 4:
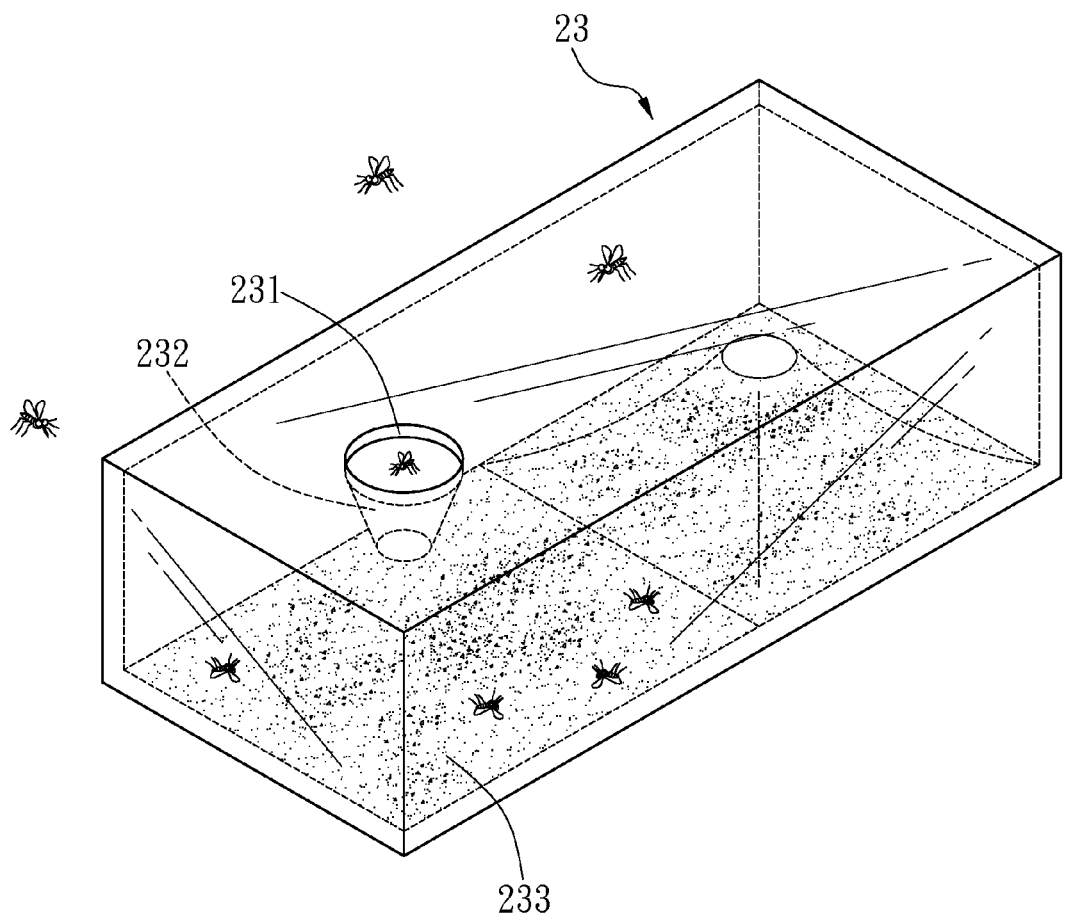
FIG. 4 is a schematic diagram of mosquitoes catching by utilizing the bubble collection box.

During the process of using water flow to remove protein residue produced by fishes in the second containing tank 22, as shown in FIG. 2, bubbles carrying with protein residue float on water and are transported to the bubble collection box 23. The bubble collection box 23 is shown in FIG. 4, wherein its top is opened with an opening 231. The opening wall of the opening 231 is extended with a converged taper section 232 toward the box body therein. The bubble collection box 23 communicates with outside through the opening 231. A protein decomposition unit 233 is contained in the bubble collection box 23 and has a *Rhodotorula* spp. and syrup in the embodiment, wherein *Rhodotorula* spp. can use syrup and protein residue to perform fermentation to produce carbon dioxide and acid gas. Carbon dioxide and acid gas are preferred and attracted by mosquitoes and drive mosquitoes to enter the bubble collection box 23 from the opening 231. Once mosquitoes enter the box, these mosquitoes may not fly away from the box due to upper wide and lower narrow design of the taper section 232 of the opening 231 so that the bubble collection box 23 forms a trap, and mosquitoes finally die in the box to achieve an objective of catching and killing mosquitoes.

In addition, since mosquitoes have photokinesis and would approach toward a light source direction and further hide at dark places. Therefore, a lamp 111 capable of emitting blue light in which the wavelength is 350 nm to 420 nm is further disposed at the box body 11 of the filter to drive mosquitoes to approach toward aquarium. The inside of the bubble collection box 23 is dark and further enhances the possibility of allowing mosquitoes to enter the trap since it can release smells of carbon dioxide and acid gas.

The portable aquarium filter device composed of the invention can be widely installed to different types of aquariums through the suspension portion. The invention takes a small submersible pump as a power to integrate the biochemical filter cotton, the protein remover, the nitrifying bacteria bed and the ultraviolet bactericidal lamp into a whole to perform multifunctional purification treatment for water quality in the aquarium. With the trap design of the bubble collection box, smell that is preferred by mosquitoes is produced by the box and incorporated with the light source to allow the invention having the function of catching mosquitoes.

The invention improves over the prior art and complies with patent application requirements, and thus is duly filed for patent application. While the invention has been described by device of specific embodiments, numerous modifications and variations could be made thereto by those generally skilled in the art without departing from the scope and spirit of the invention set forth in the claims.

What is claimed is:

1. An improved portable aquarium filter structure having a box body, at least one suspension portion capable of being suspended to an aquarium disposed at an outside of the box body, a submersible pump disposed inside the box body, an air pipe externally connected to the submersible pump, air enter the submersible pump through the air pipe to mix with water flow pumped by the submersible pump so as to produce bubbles such that water flow is treated with bubble removing and purification, wherein a bubble collection box is disposed at the box body to collect filth after performing bubble removing and purification, wherein:

an opening is disposed at the bubble collection box, and an opening wall of the opening comprises a converged taper section extended toward the box body therein, a protein decomposition unit is contained in the bubble collection box, a first containing tank, a second containing tank and a third containing tank are partitioned in the box body, and the box body is disposed with a water inlet relative to the first containing tank, and the submersible pump is disposed in the first containing tank, and a biochemical filter cotton in the first containing tank, and the submersible pump pumps water flow from the water inlet, and water flow then is filtered by the biochemical filter cotton, and water flow pumped by the submersible pump is transported to the second containing tank to perform bubble removing and purification after mixing with air, and a water inflow port is disposed between the second containing tank and the third containing tank, and a plurality of nitrification ceramic rings is disposed in the third containing tank to form a nitrifying bacteria bed, and water flow that is treated by bubble removing in the second containing tank enters the third containing tank to treat with nitrifying bacteria from the water inflow port, and water flow is finally drained away from the box body through a water outlet.

2. The improved portable aquarium filter structure as recited in claim 1, wherein the opening is disposed at a top surface of the bubble collection box.

3. The improved portable aquarium filter structure as recited in claim 1, wherein the protein decomposition unit is Rhodotorula spp. and syrup.

4. The improved portable aquarium filter structure as recited in claim 1, wherein the box body is further disposed with a lamp capable of emitting blue light in which a wavelength is 350 nm to 420 nm.

5. The improved portable aquarium filter structure as recited in claim 1, wherein the nitrification ceramic rings in the third containing tank are placed on a net plate, and a water flow space is further formed below the third containing tank through a partition of the net plate such that water flow firstly flows through the water flow space from the water inflow port, and water flow then passes through the net plate to enter the nitrifying bacteria bed composed of each nitrification ceramic ring.

6. The improved portable aquarium filter structure as recited in claim 1, wherein a heat dissipation device is further mounted on the third containing tank, and the heat dissipation device contains at least one heat dissipation fan and a plurality of heat dissipation holes.

7. The improved portable aquarium filter structure as recited in claim 1, wherein a fourth containing tank is further formed at a side of the third containing tank, and water flow that is treated by nitrifying bacteria in the third containing tank then flows into the fourth containing tank, and box body has the water outlet relative to the fourth containing tank.

8. The improved portable aquarium filter structure as recited in claim 7, wherein an ultraviolet bactericidal lamp is contained in the fourth containing tank.

\* \* \* \* \*